United States Patent
Ihle et al.

(10) Patent No.: US 8,976,585 B2
(45) Date of Patent: Mar. 10, 2015

(54) MEMORY MODULE FOR SIMULTANEOUSLY PROVIDING AT LEAST ONE SECURE AND AT LEAST ONE INSECURE MEMORY AREA

(75) Inventors: Markus Ihle, Kusterdingen (DE); Axel Aue, Korntal-Muenchingen (DE); Robert Szerwinski, Esslingen (DE); Oliver Bubeck, Pluederhausen (DE); Jamshid Shokrollahi, Ludwigsburg (DE); Jan Hayek, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/642,922

(22) PCT Filed: Oct. 21, 2010

(86) PCT No.: PCT/EP2010/065858
§ 371 (c)(1),
(2), (4) Date: Feb. 5, 2013

(87) PCT Pub. No.: WO2011/134541
PCT Pub. Date: Nov. 3, 2011

(65) Prior Publication Data
US 2013/0128664 A1    May 23, 2013

(30) Foreign Application Priority Data
Apr. 27, 2010 (DE) .......................... 10 2010 028 231

(51) Int. Cl.
| | |
|---|---|
| G11C 16/04 | (2006.01) |
| G11C 7/00 | (2006.01) |
| G11C 16/06 | (2006.01) |
| G11C 11/00 | (2006.01) |
| G11C 16/22 | (2006.01) |
| G06F 21/79 | (2013.01) |

(52) U.S. Cl.
CPC ............. *G11C 16/06* (2013.01); *G11C 11/005* (2013.01); *G11C 16/22* (2013.01); *G06F 21/79* (2013.01)
USPC ....................................... 365/185.04; 365/195

(58) Field of Classification Search
USPC .................................................... 365/185.04
See application file for complete search history.

(56) References Cited

U.S. PATENT DOCUMENTS

| | | | | |
|---|---|---|---|---|
| 4,974,208 | A | * | 11/1990 | Nakamura et al. ............ 365/228 |
| 5,267,218 | A | * | 11/1993 | Elbert ....................... 365/185.04 |
| 5,293,424 | A | * | 3/1994 | Holtey et al. ................. 713/193 |
| 5,491,809 | A | * | 2/1996 | Coffman et al. .............. 711/103 |
| 5,732,017 | A | | 3/1998 | Schumann et al. |
| 5,749,088 | A | * | 5/1998 | Brown et al. ................. 711/115 |

(Continued)

FOREIGN PATENT DOCUMENTS

| | | |
|---|---|---|
| EP | 1 067 557 | 1/2001 |
| JP | 2001-526819 | 12/2001 |

(Continued)

OTHER PUBLICATIONS

International Search Report for PCT/EP2010/065858, dated Mar. 28, 2011.

*Primary Examiner* — Son Mai
(74) *Attorney, Agent, or Firm* — Kenyon & Kenyon LLP

(57) ABSTRACT

A memory module has at least one secure and at least one insecure memory area, separate write/read electronic units for each of the memory areas and at least one shared analog circuit part such as a voltage supply circuit for supplying the write/read electronic units and/or the memory areas.

16 Claims, 1 Drawing Sheet

(56) References Cited

U.S. PATENT DOCUMENTS

| | | | |
|---|---|---|---|
| 6,032,237 A * | 2/2000 | Inoue et al. | 711/163 |
| 6,094,724 A | 7/2000 | Benhammou et al. | |
| 6,122,216 A * | 9/2000 | Dykes | 365/230.03 |
| 6,421,279 B1 * | 7/2002 | Tobita et al. | 365/189.011 |
| 6,510,501 B1 * | 1/2003 | Ho | 711/163 |
| 6,975,547 B2 * | 12/2005 | Byeon et al. | 365/195 |
| 7,197,595 B2 * | 3/2007 | Asari et al. | 711/103 |
| 7,210,012 B2 * | 4/2007 | Lee et al. | 711/163 |
| 7,418,602 B2 * | 8/2008 | Yoshida et al. | 713/193 |
| 7,849,310 B2 * | 12/2010 | Watt et al. | 713/164 |
| 8,209,550 B2 * | 6/2012 | Gehrmann | 713/193 |
| 8,245,000 B2 * | 8/2012 | Ramezani | 711/163 |
| 8,370,644 B2 * | 2/2013 | Handschuh et al. | 713/193 |
| 2004/0181708 A1 * | 9/2004 | Rothman et al. | 714/10 |
| 2007/0016832 A1 * | 1/2007 | Weiss | 714/100 |
| 2007/0150754 A1 * | 6/2007 | Pauly et al. | 713/193 |
| 2007/0199046 A1 | 8/2007 | O'Brien | |
| 2009/0183009 A1 * | 7/2009 | Delfs et al. | 713/193 |
| 2009/0296479 A1 | 12/2009 | Yamaoka et al. | |
| 2013/0305342 A1 * | 11/2013 | Kottilingal et al. | 726/11 |

FOREIGN PATENT DOCUMENTS

| | | |
|---|---|---|
| JP | 2002-353960 | 12/2002 |
| JP | 2008-310350 | 12/2008 |
| WO | WO 02/01368 | 1/2002 |

* cited by examiner

MEMORY MODULE FOR SIMULTANEOUSLY PROVIDING AT LEAST ONE SECURE AND AT LEAST ONE INSECURE MEMORY AREA

BACKGROUND OF THE INVENTION

1. Field of the Invention

The present invention relates to a memory module for simultaneously providing at least one secure and at least one insecure memory area, as well as to a microcontroller having such a memory module.

2. Description of the Related Art

The present invention relates to the field of so-called secure microcontrollers, in particular in the automotive industry. For most applications in safety-relevant areas, non-manipulatable or non-viewable storage of data is an essential basic requirement. The keys for symmetric methods or private keys of asymmetric methods are secrets and therefore must be kept secret from attackers. Other applications require at least protection against changes, for example, storing of serial numbers or mileage, preventing chip tuning, etc.

It is therefore customary to provide secure environments for executing functions which must view and/or change these secrets. These environments usually include a "secure CPU" and a separate memory module for the secure non-volatile storing of data, also referred to as "secure NVM" (NVM=Non-Volatile Memory), which may be addressed only via the "secure CPU."

For providing secure functions, it is contemplated to use microcontrollers which in addition to the usual microcontroller components such as CPUs, memory modules, buses, I/O interfaces, etc., also include a secure CPU and a secure memory module. Providing the secure environment in a microcontroller is, however, relatively complicated, which is due, in particular, to the technology of the non-volatile memories normally used today. The secure memory module is normally designed as a flash module and includes, like all flash memory modules, the actual memory cells (transistors), a write/read electronic unit for operating the memory (for example, a state machine, address buffers, data buffers, line decoders, column decoders, etc.), an interface unit for connecting the write/read electronic unit to the internal microcontroller bus, as well as an analog circuit part for supplying and/or amplifying voltage, and the like. In particular, this analog circuit part, which normally (for example, flash, EEPROM) includes a charge pump and a battery of amplifiers, requires a very large chip surface and results in considerable costs for the module.

It is therefore desirable to have to use only one memory module in secure microcontrollers for storing both secure and insecure data. However, in the memory modules used in the related art, the user (normally a CPU) accessing such a memory is able to view and modify the entire data area, so that one memory module is used for secure data and one memory module for insecure data.

BRIEF SUMMARY OF THE INVENTION

The present invention is based on the idea of making the simultaneous provision of secure and non-secure, i.e., insecure memory areas in a memory module, particularly simple, if for this purpose only those elements needed for providing the security functionality come in multiple forms, while all other elements come in single form, if possible. In particular, a memory module may simultaneously provide secure and insecure memory areas if a separate write/read electronic unit is provided for each memory area; however, only one analog circuit part, such as a voltage supply circuit, is provided for all write/read electronic units in the memory module. The present invention describes an extended memory module, which allows the joint use of a large memory for multiple users. It allows the users to use [memory] portions dedicated to them, whereby the security of the secret and/or non-manipulatable data remains ensured. A memory module according to the present invention may be advantageously defined on the chip as a single so-called hard macro.

Only one interface unit is advantageously provided for connecting the write/read electronic units. Thus, as a result, multiple memory areas having separate write/read electronic units are provided in a single memory module, superfluous interface units being particularly advantageously omitted.

According to one advantageous embodiment of the present invention, the memory module is designed as a flash memory module, only one charge pump and/or one battery of amplifiers (battery of write/read amplifiers) being provided for supplying the intended number of memory areas and write/read units. In particular in the case of flash memories, the present invention offers special advantages, since the voltage supply circuit as a component of the analog circuit part is particularly complex in this case.

It is understood that the above-named features and those to be elucidated below are usable not only in the given combination, but also in other combinations or alone without departing from the scope of the present invention.

The present invention is schematically illustrated in the drawing on the basis of an exemplary embodiment and is described in detail below with reference to the drawing.

DETAILED DESCRIPTION OF THE INVENTION

Figure 1:
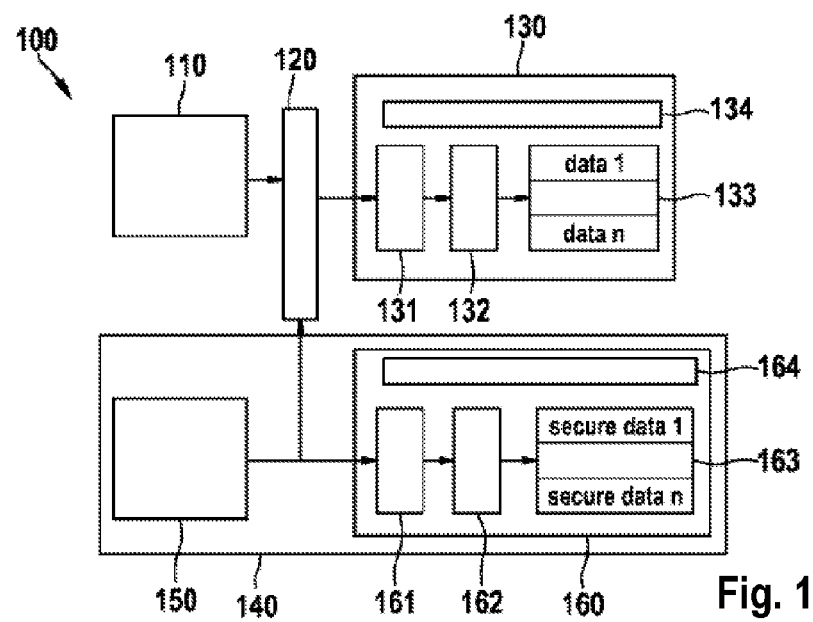
FIG. 1 schematically shows the structure of a secure microcontroller, which is not included in the scope of protection of the present invention.
Figure 2:
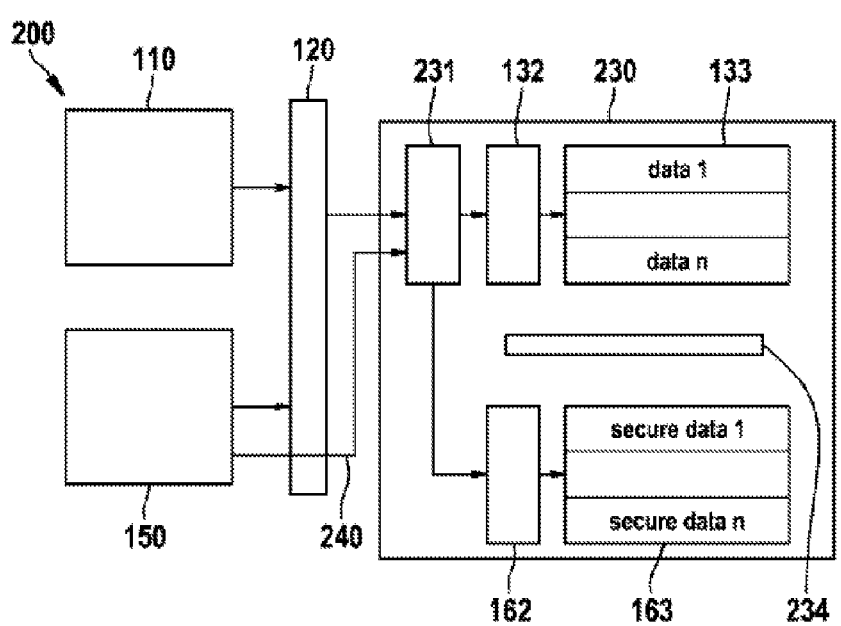
FIG. 2 schematically shows the structure of a microcontroller including a memory module according to one preferred specific embodiment of the present invention.

FIGS. 1 and 2 show only the components of a microcontroller relevant to the present invention, the same elements being provided with the same reference numerals.

FIG. 1 schematically illustrates a secure microcontroller, which is labeled overall by the reference numeral 100. Microcontroller 100 includes a main arithmetic unit, i.e., a main CPU 110, which is connected to a bus 120 within the microcontroller. A first memory module 130, which is provided for storing data non-securely, is also connected to bus 120.

Furthermore, a secure environment 140 is provided in microcontroller 100 via a secure CPU 150 and a secure memory module 160. In order to execute secure functions, secure CPU 150 is addressed via bus 120 and then accesses secure memory module 160 if necessary.

Memory modules 130 and 160 have essentially identical designs, each having an interface unit 131 and 161, respectively, for connecting the memory module to bus 120 within the microcontroller, a write/read electronic unit 132 and 162, respectively, and actual memory areas 133 and 163, respectively. Memory modules 130 and 160 advantageously include flash memories, so that memory areas 133 and 163 include a number of floating-gate transistors as memory cells. Furthermore, memory modules 130 and 160 each include an analog circuit part 134 and 164, respectively, which, in the described example of a flash memory, include at least one voltage supply circuit having a charge pump and a battery of write/read amplifiers. Write/read electronic units 132 and 162 each include, for example, a state machine, address buffers, data buffers, line decoders, column decoders, etc. Memory modules 130 and 160 are separate modules and therefore defined as separate hard macros on the chip surface.

FIG. 2 schematically illustrates a microcontroller 200 according to one preferred specific embodiment of the present invention. Microcontroller 200 also includes a number of components of which again only those relevant to the present invention are illustrated. Components already shown in FIG. 1 are provided with the same reference numerals.

Microcontroller 200 includes a memory module 230 according to one preferred specific embodiment of the present invention. Memory module 230 is designed for simultaneously providing an insecure memory area 133 and a secure memory area 163. Memory areas 133 and 163 are each provided with corresponding write/read electronic units 132 and 162, respectively. Write/read electronic units 132 and 162 each include, for example, a state machine, address buffers, data buffers, line decoders, column decoders, etc., i.e., essentially those elements which are necessary for providing securely separated memory areas.

Advantageously, however, memory module 230 has only one analog circuit part 234 which, in the case of a flash memory, includes in particular a voltage supply circuit having a charge pump and/or a battery of write/read amplifiers, and which is used for supplying all elements of memory module 230.

According to the illustrated preferred specific embodiment, write/read electronic units 132 and 162 are connected to the outside, in the present case to bus 120 within the microcontroller, via a single interface unit 231.

Memory module 230 may be advantageously defined as a hard macro on the chip surface for simultaneously providing secure and insecure, i.e., non-secure, memory areas.

According to the specific embodiment of the present invention illustrated herein, secure CPU 150 is connected to secure memory module 230 or to its interface unit 231 via an identification link 240. By adding an appropriate circuit logic to interface unit 231, access of users to different memory areas 133 and 163 may be limited if the user performing the access is unambiguously identifiable. Unambiguous identification may take place, for example, via identification link 240. However, identification may also take place via bus 120, for which purpose known signals, such as a master interface identifier, may be used.

Although in the present example only two users, i.e., CPUs 110 and 150, access only two memory areas, i.e., memory areas 133 and 163, in secure memory module 230, the present invention is not limited to this specific embodiment. Instead, any number of users and any number of memory areas may be provided independently of one another.

What is claimed is:

1. A memory module, comprising:
   at least one secure memory area;
   at least one insecure memory area;
   a first write-and-read electronic unit for the secure memory area;
   a second write-and-read electronic unit for the insecure memory area; and
   at least one shared analog circuit part for at least one of (i) multiple write-and-read electronic units including the first and second write-and-read electronic units, and (ii) multiple memory areas including the secure memory area and the insecure memory area.

2. The memory module as recited in claim 1, wherein exactly one shared analog circuit part is provided.

3. The memory module as recited in claim 1, wherein the shared analog circuit part includes a voltage supply circuit.

4. The memory module as recited in claim 1, further comprising:
   at least one shared interface unit for connecting multiple write-and-read electronic units including the first and second write-and-read electronic units.

5. The memory module as recited in claim 4, wherein exactly one shared interface unit is provided.

6. The memory module as recited in claim 4, wherein:
   the secure memory area and the insecure memory area are flash memory areas; and
   the shared analog circuit part includes at least one of a charge pump and a battery of write-and-read amplifiers.

7. A microcontroller, comprising:
   a memory module having:
      at least one secure memory area;
      at least one insecure memory area;
      a first write-and-read electronic unit for the secure memory area;
      a second write-and-read electronic unit for the insecure memory area; and
      at least one shared analog circuit part for at least one of (i) multiple write-and-read electronic units including the first and second write-and-read electronic units, and (ii) multiple memory areas including the secure memory area and the insecure memory area.

8. The microcontroller as recited in claim 7, further comprising:
   at least one main CPU; and
   at least one secure CPU;
   wherein the main CPU and the secure CPU are each connected to the memory module and access the module for at least one of writing and reading data.

9. The microcontroller as recited in claim 8, wherein the memory module includes at least one shared interface unit for connecting multiple write-and-read electronic units including the first and second write-and-read electronic units, and wherein the main CPU and the secure CPU are each connected to the shared interface unit of the memory module via a bus link within the microcontroller.

10. The microcontroller as recited in claim 9, wherein the secure CPU is additionally connected to the memory module via an additional identification link.

11. The microcontroller as recited in claim 10, wherein the secure CPU is connected to the interface unit of the memory module via the identification link.

12. A memory arrangement, comprising:
   a secure memory area;
   an insecure memory area;
   a first write-and-read electronic unit for the secure memory area, the first write-and-read electronic unit including at least one of a first state machine, first address buffers, first data buffers, first line decoders, and first column decoders;
   a second write-and-read electronic unit for the insecure memory area, the second write-and-read electronic unit including at least one of a second state machine, second address buffers, second data buffers, second line decoders, and second column decoders; and
   a shared analog circuit part that is controllable for at least one of (a) setting a voltage level to correspond to a read/write operation for both of the secure memory area and the insecure memory area and (b) amplifying signals of both of the secure memory area and the insecure memory area.

13. The memory arrangement as recited in claim 12, wherein the secure memory area and the insecure memory area are flash memory components.

14. The memory arrangement as recited in claim 12, wherein each of the write-and-read electronic units includes a respective state machine, respective address buffers, respective data buffers, respective line decoders, and respective column decoders.

15. The memory arrangement as recited in claim 12, wherein the secure memory area, the insecure memory area, the first write-and-read electronic unit, the second write-and-read electronic unit, and the shared analog circuit are provided as a single hard macro.

16. The memory arrangement as recited in claim 12, further comprising:
   a first central processing unit (CPU);
   a second CPU; and
   a single interface unit for interfacing between (a) the secure and insecure memory areas and (b) the CPUs;
   wherein, of the first and second CPUs, the secure memory area is accessible by only the second CPU.

* * * * *